Dec. 12, 1933.   W. R. MOBLEY   1,938,604
SEPARATOR FOR LIQUIDS AND SOLIDS
Filed Dec. 8, 1930
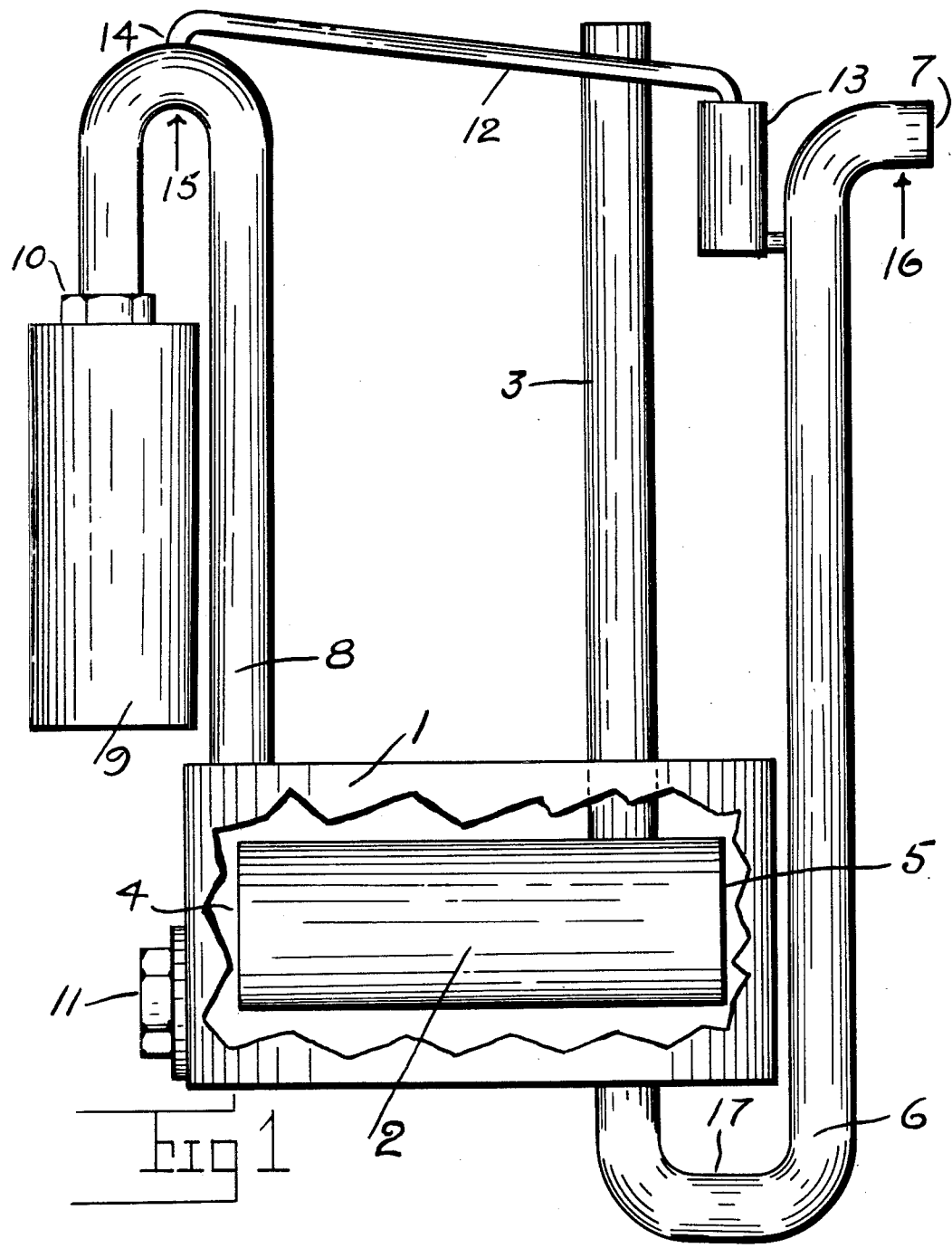
INVENTOR.
William Robert Mobley
BY
ATTORNEYS.

Patented Dec. 12, 1933

1,938,604

UNITED STATES PATENT OFFICE 1,938,604

SEPARATOR FOR LIQUIDS AND SOLIDS

William Robert Mobley, Miami, Fla.

Application December 8, 1930. Serial No. 500,807

4 Claims. (Cl. 210—51)

The principal object contemplated by this invention is to separate liquids or liquids and solids of a greater specific gravity from liquids or liquids and solids of less specific gravity and further to provide a method of equalizing the air pressure in the outlet pipes for the liquids and solids of greater and less specific gravity respectively and still further to cause the height of the liquids to remain at their respective heights according to the specific gravity of the said liquids and solids respectively.

The invention can be applied as a plumbing fixture to basins, sinks and the like, arranged between the sink and the drain or sewer, and the present form of my invention is designed as such a fixture. In operation all grease, which would ultimately stop up the drain, in a saponified solid condition, under normal conditions of water flow, is collected and kept from entrance into the drain. It can also be applied for the separation of petroleum and water from a mixture of the same.

I accomplish these desirable features by means of the novel device described in the specification and illustrated in the drawing which accompanies and forms part of this specification.

In the drawing in which like numerals designate corresponding parts throughout:—

The figure is a side elevation having a part broken away to more clearly show the interior.

The device comprises an outer separating chamber 1 having contained within itself an inner or primary retarding and distributing chamber 2 to which is connected an intake pipe 3 leading from a sink or other supply, through which pipe are admitted to the chamber 1 liquids or liquids and solids of different specific gravity. By way of illustration we will employ water as the liquid of greater specific gravity and certain food-waste as the solids of greater specific gravity while oil or grease will be accepted as the liquid of less specific gravity and granulated cork or other light material as the solids of less specific gravity. These are permitted to enter the pipe line 3 simultaneously where by the aid of gravity they are conveyed to the primary expansion chamber 2 where the velocity in rate of travel is immediately decreased. These incoming liquids or liquids and solids escape from the chamber 2 at one or both ends as at 4 and 5 then enter the secondary chamber 1 wherein complete separation occurs, the liquid or liquid and solids of less specific gravity rise to the top of the chamber 1 while the liquid or liquid and solids of greater specific gravity fall to the bottom and are conveyed by the pipe line 6 to a sewer conduit or the like which may be attached at 7. The liquid and solids of less specific gravity are conveyed from the chamber 1 by or through the pipe line 8 into a detachable receptacle 9 retained in position by the union 10.

The chamber 1 is provided with a detachable plug 11 for purpose of cleaning the interior.

Connecting the two outlet pipes 6 and 8 respectively is an air line 12 having organized with itself at a desirable height an air expansion chamber 13.

The pipe line 12 connects to the outlet pipe 8 at a point above the natural high level of the liquid of less specific gravity as at 14, the natural high level being suggested at the arrow 15. The opposite end of the pipe 12 after communicating with the chamber 13 connects to the pipe line 6 at a point below the natural level which point may be accepted as being located at the arrow 16.

The object of the air pipe 12 and the air expansion chamber 13 is to equalize the air pressure in the outlet pipes 8 and 6 respectively so that they will retain their respective heights according to their specific gravity.

The air line 12 in addition to functioning as already set forth allows the air and gas displaced in the receptacle 9 to escape into the sewer conduit through the pipe line 6.

It will be observed that a customary gooseneck is formed at the lower end of the outlet pipe 6 this being desirable as a preventative against foul odors returning from the sewer conduit into the chamber 1 when the plug 11 is removed for purpose of cleaning the device.

Having now particularly described and ascertained the nature of this invention and the manner in which it is proposed to perform same, what I claim as new and desire to secure by United States Letters Patent is:

1. In a separator for liquids or liquids and solids of different specific gravity, an intake for the said liquids or liquids and solids, independent outlets for same after separation, and an air pipe connecting said outlets and leading from above the level of the lighter separated liquid to a point below the level of the heavier separated liquid.

2. In a separator for liquids or liquids and solids of different specific gravity, a separating chamber having an intake for the said liquids or liquids and solids, independent outlet pipes for same after separation and an air line communicating between the said outlet pipes, said air line adapted to enter the outlet for liquid or liquid and solids of less specific gravity at a point above the natural high level of such liquid or liquid and solids at its one end and to enter the outlet pipe for liquid or liquid and solids of greater specific gravity at a point at or below the natural level of such liquid or liquid and solids at its opposite end.

3. In a separator for liquids or liquids and solids of different specific gravity, a separating chamber having an intake for the said liquids or liquids and solids, a separating chamber and a distributing chamber therein, independent outlets for liquids after separation and an air line having an air expansion chamber, said air line communicating with the outlet pipes above the level of the lighter liquid and below the level of the heavier liquid.

4. In a separator for liquids or liquids and solids of different specific gravity, a separating chamber having an intake for the same, an outer separating chamber, an inner distributing chamber, independent outlets for the liquids or liquids and solids after separation, an air tight receptacle to receive the liquid or liquid and solids of less specific gravity and an air vent communicating with the said air tight receptacle above the liquid level therein and communicating with the heavier liquid outlet below the surface of the liquid being discharged.

WILLIAM ROBERT MOBLEY.